(12) United States Patent
Eltabakh et al.

(10) Patent No.: US 9,910,860 B2
(45) Date of Patent: Mar. 6, 2018

(54) SPLIT ELIMINATION IN MAPREDUCE SYSTEMS

(71) Applicant: INTERNATIONAL BUSINESS MACHINES CORPORATION, Armonk, NY (US)

(72) Inventors: Mohamed Eltabakh, San Jose, CA (US); Peter J. Haas, San Jose, CA (US); Fatma Ozcan, San Jose, CA (US); Mir Hamid Pirahesh, San Jose, CA (US); John (Yannis) Sismanis, San Jose, CA (US); Jan Vondrak, Stanford, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 928 days.

(21) Appl. No.: 14/174,262

(22) Filed: Feb. 6, 2014

(65) Prior Publication Data
US 2015/0220529 A1 Aug. 6, 2015

(51) Int. Cl.
G06F 17/30 (2006.01)
(52) U.S. Cl.
CPC .............. *G06F 17/30194* (2013.01)
(58) Field of Classification Search
CPC .............. G06F 17/30598; G06F 17/30705
USPC .................................. 707/737, 713
See application file for complete search history.

(56) References Cited

U.S. PATENT DOCUMENTS

| 7,428,528 | B1* | 9/2008 | Ferrari | G06F 17/30855 |
| 7,685,091 | B2* | 3/2010 | Boone | G06F 17/30716 |
| | | | | 705/7.29 |
| 7,856,434 | B2* | 12/2010 | Gluzman Peregrine | |
| | | | | G06F 17/30991 |
| | | | | 707/722 |

(Continued)

OTHER PUBLICATIONS

Eltabakh, M.Y., Ozcan, F., Sismanis, Y., Haas, P., Pirahesh, H. & Vondrak, J. "Eagle-Eyed Elephant: Split-Oriented Indexing in Hadoop." IBM Almaden Research Center, San Jose, CA, 1-12.

(Continued)

*Primary Examiner* — Robert Beausoliel, Jr.
*Assistant Examiner* — Alexandria Bromell
(74) *Attorney, Agent, or Firm* — Erik Huestis; Stephen Kenny; Foley Hoag LLP (57) ABSTRACT

Embodiments of the present invention relate to elimination of blocks such as splits in distributed processing systems such as MapReduce systems using the Hadoop Distributed Filing System (HDFS). In one embodiment, a method of and computer program product for optimizing queries in distributed processing systems are provided. A query is received. The query includes at least one predicate. The query refers to data. The data includes a plurality of records. Each record comprises a plurality of values in a plurality of attributes. Each record is located in at least one of a plurality of blocks of a distributed file system. Each block has a unique identifier. For each block of the distributed file system, at least one value cluster is determined for an attribute of the plurality of attributes. Each value cluster has a range. The predicate of the query is compared with the at least one value cluster of each block. The query is executed against only those blocks where the predicate is met by at least one value cluster.

10 Claims, 7 Drawing Sheets

(56) References Cited

U.S. PATENT DOCUMENTS

| | | | | |
|---|---|---|---|---|
| 8,051,084 B2* | 11/2011 | Tunkelang | ........ | G06F 17/30424 707/737 |
| 8,463,783 B1* | 6/2013 | Yagnik | ................ | G06Q 30/02 707/737 |
| 8,620,900 B2* | 12/2013 | Luk | ................ | G06F 17/30616 707/715 |
| 8,626,764 B2* | 1/2014 | Erlanger | ............ | G06F 19/28 707/737 |
| 8,935,249 B2* | 1/2015 | Traub | ............ | G06F 17/30657 707/737 |
| 8,990,210 B2* | 3/2015 | Egnor | ............ | G06F 17/30864 707/737 |
| 9,275,338 B2* | 3/2016 | Noel | ................... | G06F 9/542 |
| 2003/0033126 A1* | 2/2003 | Lincoln | ................ | G06F 19/12 703/11 |
| 2003/0097357 A1* | 5/2003 | Ferrari | ............ | G06F 17/30864 |
| 2003/0121027 A1* | 6/2003 | Hines | ................ | G06F 11/362 717/135 |
| 2005/0050030 A1* | 3/2005 | Gudbjartsson | .... | G06F 17/30595 |
| 2006/0218123 A1* | 9/2006 | Chowdhuri | ....... | G06F 17/30445 |
| 2010/0036803 A1* | 2/2010 | Vemuri | ............ | G06F 17/3051 707/714 |
| 2011/0040762 A1* | 2/2011 | Flatland | ............ | G06F 17/30622 707/737 |
| 2011/0196857 A1* | 8/2011 | Chen | ................ | G06F 17/30457 707/714 |
| 2011/0302583 A1* | 12/2011 | Abadi | ................ | G06F 17/30545 718/102 |
| 2012/0011119 A1* | 1/2012 | Baheti | ................ | G06F 17/30247 707/737 |
| 2012/0084315 A1* | 4/2012 | Schneider | ......... | G06F 17/30442 707/769 |
| 2012/0182891 A1 | 7/2012 | Lee | | |
| 2012/0191716 A1* | 7/2012 | Omoigui | ............ | H01L 27/1463 707/740 |
| 2012/0226639 A1 | 9/2012 | Burdick | | |
| 2012/0310916 A1* | 12/2012 | Abadi | ................ | G06F 17/30445 707/713 |
| 2014/0143252 A1* | 5/2014 | Silverstein | ........... | G06Q 10/105 707/737 |

OTHER PUBLICATIONS

Zhu, B., Li, K. & Patterson, H. "Avoiding the Disk Bottleneck in the Data Domain Deduplication File System." (2008) In Proceedings of the 6th USENIX Conference on File and Storage Technologies, San Jose, CA, 1-14.

Bhatotia, P., Rodrigues, R. & Verma, A. "Shredder: GPU-Accelerated Incremental Storage and Computation." (2012) Max Planck Institute for Software Systems (MPI-SWS) and IBM Research, India, 1-15.

Buck, J.B., Watkins, N., LeFevre, J., Ioannidou, K., Maltzahn, C., Polyzotis, N. & Brandt, S. "SciHadoop: Array-based Query Processing in Hadoop." (2012) SC11, Seattle, WA, 1-11.

* cited by examiner

SPLIT ELIMINATION IN MAPREDUCE SYSTEMS

BACKGROUND

Embodiments of the present invention relate to optimizing queries in distributed processing systems, and more specifically, to elimination of blocks such as splits in distributed processing systems such as MapReduce systems using the Hadoop Distributed File System (HDFS).

BRIEF SUMMARY

According to one embodiment of the present invention, a method of and computer program product for optimizing queries in distributed processing systems are provided. A query is received. The query includes at least one predicate. The query refers to data. The data includes a plurality of records. Each record comprises a plurality of values in a plurality of attributes. Each record is located in at least one of a plurality of blocks of a distributed file system. Each block has a unique identifier. For each block of the distributed file system, at least one value cluster is determined for an attribute of the plurality of attributes. Each value cluster has a range. The predicate of the query is compared with the at least one value cluster of each block. The query is executed against only those blocks where the predicate is met by at least one value cluster.

According to another embodiment of the present invention, a method of and computer program product for optimizing queries in distributed processing systems are provided. A query is received. The query includes at least one predicate. The query refers to data. The data includes a plurality of records. Each record comprises a plurality of values in a plurality of attributes. Each record is located in at least one of a plurality of blocks of a distributed file system. Each block has a unique identifier. A block count is determined that indicates the number of blocks in which each of the values of the data appear. A record count is determined that indicates the number of instances of each of the values in each of the attributes. Based on the block count, a profit value is determined that is associated with copying each of the values of the data to a materialized view. Based on the record count, a cost value is determined that is associated with copying each of the values of the data to a materialized view. A predetermined number of values is selected such that the profit to cost ratio is maximal for the predetermined number of values. A materialized view is provided that comprises the predetermined number of values. Whether the query is applicable to the materialized view is determined. The query is executed against the materialized view if it is applicable to the materialized view.

According to yet another embodiment of the present invention, a method of and computer program product for optimizing queries in distributed processing systems are provided. A query is received. The query includes a plurality of predicates. The query refers to data. The data includes a plurality of records. Each record comprises a plurality of values in a plurality of attributes. Each record is located in at least one of a plurality of blocks of a distributed file system. Each block has a unique identifier. For each block of the distributed file system, at least one value cluster is determined for an attribute of the plurality of attributes. Each cluster has a range. Each of the plurality of blocks is traversed to determine unique values located in each block. An index is built that maps the unique values to the block identifiers of the blocks in which the unique values appear. A cache is maintained that contains the identifiers of blocks from which results were received as a result of execution of prior queries. For each predicate of the plurality of predicates, a list of blocks is determined by either: comparing the predicate with the at least one value cluster of each block to determine those blocks where the predicate is met by at least one value cluster; comparing the predicate with the index to determine those blocks where there exists a mapping in the index from a predicate value to the identifiers of those blocks; or determining whether there is a cache hit for the predicate and if there is a cache hit, determining those blocks whose identifiers appear in the cache. An execution list of blocks is determined based on the list of blocks for each predicate. The query is executed against those blocks appearing in the execution list of blocks.

DETAILED DESCRIPTION

An increasingly important analytics scenario for Hadoop involves multiple (often ad hoc) grouping and aggregation queries with selection predicates over a slowly-changing dataset. These queries are typically expressed via high-level query languages such as Jaql, Pig, and Hive, and are used either directly for business-intelligence applications or to prepare the data for statistical model building and machine learning. In such scenarios techniques for avoiding access to irrelevant data can dramatically improve query performance. However, record-level indexing only slightly improves overall query performance, because it does not minimize the number of mapper "waves", which is determined by the number of processed splits. Moreover, key-based partitioning requires data reorganization, which is usually impractical in Hadoop settings. Consequently, there remains a need in the art for a redefinition of data access mechanisms. To this end, the present disclosure describes a framework for boosting the efficiency of query processing in Hadoop or other distributed systems by avoiding accesses of data splits that are irrelevant to the query at hand. Using novel techniques involving inverted indexes over splits, domain segmentation, materialized views, and adaptive caching, the system of the present disclosure avoids accessing irrelevant splits even in the face of evolving workloads and data. Application of the disclosed techniques achieves up to 20× cost savings with small to moderate storage overheads.

Application of the techniques of the disclosed subject matter improves the performance of massive-scale analytics in an important and increasingly common user scenario. Specifically, the present disclosure is applicable to warehouse-like exploratory analysis environments in which the Hadoop open source implementation of MapReduce is used together with a higher-level interface such as Jaql, Pig, or Hive to execute multiple (and often ad hoc) grouping and aggregation queries with selection predicates over a slowly changing dataset. The queries are used either directly for business-intelligence applications or to prepare the data for statistical model building and machine learning. The query workload typically evolves in ways that are not known a priori; i.e., certain attributes and attribute values are intensely queried for a while, after which a different set of attributes and attribute values are frequently queried, and so on, but the precise sequence of query patterns is not known in advance.

One example of such a scenario would be where a credit card company requires leading analytics capabilities for predicting credit card fraud, as well as strong data-warehouse capabilities for analyzing information generated from cardholder accounts, merchants, consumer banks, and more. In such a scenario, a distributed processing framework such as Hadoop may be used to perform data analysis of many years of highly-structured credit-card transaction data. The analytics needed for marketing and risk assessment may be highly varied, may involve custom algorithms and many different third-party modules that required exploratory analysis, and may require various statistical summaries. Multiple selective queries may need to be run on the transaction data in order to support the development of new prediction techniques, e.g., as new fraud patterns emerge. Different portions of the data may need to be repeatedly sampled for building, refining, and validating models, and to materialize data representing different time periods, customer segments, and so on, to feed into the models once they are built.

Another example is a wind-power generation company that simulates global wind patterns and produces petabytes of semi-structured and nested data. Such data may be stored in a Hadoop Distributed File System (HDFS) and may be queried by MapReduce. It may be necessary to explore the simulation output by repeatedly running ad hoc selection queries, continuously evaluating and analyzing the results.

As illustrated by these examples, the data to be analyzed may be structured or only semi-structured. By storing the data is HDFS and querying it via MapReduce, the burdensome need to structure the data into rigid schemas prior to analysis is avoided.

There remains a continuing pressure to enhance query processing efficiency. Indeed, evolving infrastructure-as-a-service (IaaS) pricing models require users to pay according to the hardware and energy resources that they use, so there is an increasing need to reduce such costs. The most important strategy for improving query performance is to avoid processing data that is irrelevant to the query. However, record-level indexing and key-based partition elimination result in minimal gains in comparison to their complexity.

The key issue for indexing is that the wall-clock execution time for a query depends on the number of "waves" of mappers that are executed, which in turn depends on the number of processed splits—logical partitions of the data as specified in the Hadoop InputFormat interface. (One mapper task is created for each split.) The cost of processing a split is dominated by the I/O cost of reading the split and the overhead of starting up the mapper that processes the split. So the cost of processing one or two records in a split is typically not much less than the cost of processing every record in the split. A record-level indexing technique that ignores this feature of Hadoop does not perform well. Such techniques do not translate to end-to-end savings unless both the Hadoop Distributed File System (HDFS) and Hadoop itself are thoroughly re-engineered. In contrast, the solutions discussed below do not require such reengineering.

A system in which only clustered indexes on the keys are used to partition the data into splits, do not realize substantial efficiencies in themselves. For example, suppose that the data are partitioned into splits by time and that transactions in each split are sorted by their timestamps. Consider the query that returns all transactions between January 2008 and August 2008 for a given customer at a given store. Using a clustered index on dates, the system can eliminate (i.e., avoid the reading and processing of) splits that do not belong to this time interval. If, however, the customer only shops at the store once per month, many splits may be processed that contain no transactions for that customer. In this case, a secondary index on customer IDs would eliminate many splits. Similarly, if the store opened on Jul. 1, 2008, then a composite index on (store, date) value pairs would be more effective than just the clustered index on dates. Where the workload is generally unknown a priori, there is no guidance on which indexes to construct.

Physically partitioning the data according to some key, and then avoiding processing those partitions not referenced by the query, also has limited effectiveness. In one implementation, an expensive map-reduce job is required to partition the data (unless the data is already partitioned by the key), because HDFS does not provide any direct user mechanisms for data placement. If a good partitioning key is not known in advance—the usual case—then reorganizations may need to occur frequently, adding enormous overhead to query processing.

Further complicating attempts at both indexing and partition elimination is the fact that the nature of data evolution in Hadoop differs from that in a classical database system. Specifically, HDFS stores large files as a series of blocks distributed over a cluster of data nodes and replicates for purposes of fault tolerance. HDFS does not directly support in-place updates or appends to existing files; instead, new data (in the form of files) rolls in and old data is rolled out by deleting or archiving files.

To address these issues, the present disclosure provides a framework for boosting the efficiency of query processing in a distributed file system such as the Hadoop/Jaql processing environment. The present disclosure provides for the elimination of splits using enhanced, split-oriented indexing techniques that are coarser, but more effective, than record-based indexing. Furthermore, the present disclosure provides a flexible indexing scheme, based on the observation that non-key fields having large numbers of distinct values may be very effective for split elimination.

Specifically, the techniques of the present disclosure operate over a "flattened JSON" view of the data in a file in which each file and split consists of arrays of records. Each record is a collection of fields. In some embodiments, a field consists of a (name, atom) pair. In other embodiments, a field consists of a (name, atom*) pair, where arrays of atomic values are handled by creating multiple (name, atom) pairs, one for each atom in the array. An atom is an elementary data value that may be for example, a string, date, boolean, or number. As discussed below, the file of interest need not actually be stored in JSON format. Certain split-level statistics are computed for each field—such as min, max, and ranges for a numerical field. These statistics are stored in a "range index". A split-level inverted index is automatically built over all string fields. All fields are indexed, and not just the partitioning field(s); as indicated above, such comprehensive indexing greatly increases opportunities for split elimination. Moreover, there is no need to guess at a partitioning key or to repeatedly re-partition the data as the workload changes; an index is created on all fields once, and the cost of creating the index is then amortized over multiple queries. A cataloging service may be used to maintain the metadata; this service may be lightweight and inexpensive.

One challenge to the inverted-index scheme is the presence of "nasty" atoms, that is, values that are globally infrequent but appear once or twice in a large number of splits. These values are automatically identified, and the inverted index is enhanced with materialized views over the data records having nasty atoms. Then, given a query predicate that references a nasty atom, only a small number of splits in the materialized view need be accessed, rather than a large number of splits in the original file. A similar problem is posed by conjunctive queries that reference "nasty" atom-pairs, where each atom in the pair appears in many splits, but the atoms appear jointly in only a few records. One example is given by (ship date, delivery date) atom-pairs; a given individual ship date may appear in many transactions, and similarly for a given delivery date, but if these dates are unusually close or far part, the number of actual transactions that contain both dates simultaneously will be small. Substitute products are another example: many people buy iPhones or Droids, but few people buy both together. Because of the prohibitive quadratic number of atom-pairs, a complete index for all atom-pairs is too expensive to compute and store. Hence, a novel main-memory adaptive caching method is employed to maintain an inverted index only of those nasty atom-pairs that are the most "valuable" in that they are referred to frequently and result in the elimination of many splits when cached.

As mentioned above, embodiments of the present disclosure compute range statistics for each split, based on a domain segmentation scheme, and stores them in a range index. The range index allows the system to effectively prune splits that do not satisfy given range predicates in a query of interest. Finally, embodiments of the present disclosure combine the foregoing indexing techniques at query execution time to access the minimal set of splits required to process the query.

Embodiments of the present disclosure avoid the need for user-specified physical design, data movement or reorganization, or a priori knowledge about the query workload (though workload information can be exploited if available). Experiments using data with hierarchical and flexible schemas, as well as data with flat and fixed schemas, demonstrate savings in query response time of up to 20× due to split elimination while requiring a small to moderate storage overhead (5%-21%) for the corresponding indexes and materialized views. The indexing techniques of the present disclosure may additionally be applied in the setting of traditional parallel databases.

According to embodiments of the present disclosure, queries with selection predicates are sped up by avoiding useless splits to the greatest extent possible. Disclosed below are the computation of the range index and the inverted index as well as the identification of nasty atoms and the use of a materialized view to tame them. Also disclosure below is a main-memory adaptive caching algorithm used to handle nasty atom-pairs.

As indicated previously, embodiments of the present disclosure can operate over a wide range of storage formats. In some embodiments, Jaql is used for processing, which allows exploitation of the adapters and converters provided by Jaql for translating the actual storage format into a JSON view for processing. Embodiments of the present disclosure can handle formats including CSV files and HDFS sequence files. In some embodiments, the disclosure techniques operate on JSON views generated by Jaql file descriptors. A file descriptor specifies the specific adapters and converters used for the data, as well as the InputFormat used for creating splits. Embodiments of the present disclosure may generate different indexes on the same data if different file descriptors are used. Therefore, for each file in the warehouse, both a file descriptor and file signature are maintained in the system catalog to ensure that the correct index is used to eliminate splits in a Jaql query over the file. Embodiments of the present disclosure use a flattened JSON view of the data. In general, JSON data comprises atoms, arrays, and records (sets of name-value pairs), which can be arbitrarily nested to any depth. Embodiments of the present disclosure flatten this nested structure so that each field name becomes a root-to-leaf path name and each field value corresponds to the atom(s) at the end of the path.

Figure 1:
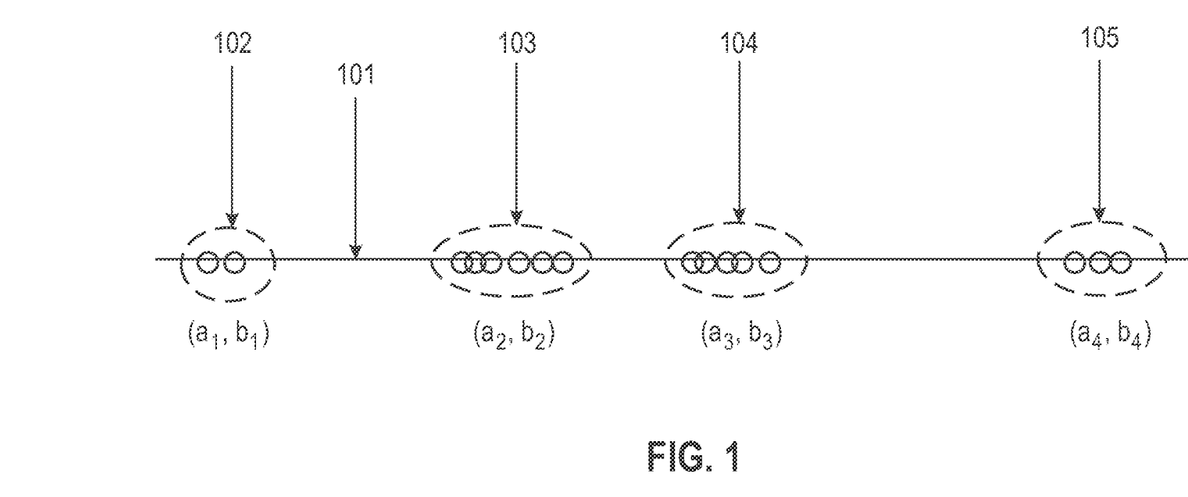
FIG. 1 depicts a plurality of value clusters according to an embodiment of the present invention.

Referring to FIG. 1, domain segmentation for range indexing is depicted. Values are depicted in a natural order along number line 101. Clusters 102, 103, 104 and 105 each comprise a plurality of values, with no values appearing between clusters. Cluster 102 ranges from $a_1$ to $b_1$. Cluster 103 ranges from $a_2$ to $b_2$. Cluster 104 ranges from $a_3$ to $b_3$. Cluster 105 ranges from $a_4$ to $b_4$.

By creating a range index which contains, for each split, range statistics, splits that do not satisfy a given range or equality predicate appearing in the query of interest are quickly eliminated. E.g., if the minimum and maximum values of "weight" in a given split are known to be 2 lbs and 3 lbs, respectively, then it is known immediately that no records in the split satisfy a predicate of the form "weight between 1.2 lbs and 1.5 lbs". However, if the atoms within a split are clustered in small subranges of the overall min-max range, then merely storing the minimum and maximum values for a field may lead to many false positives. For example, suppose the atoms for a given field in a given split are as in FIG. 1, so that the minimum and maximum atom values are $a_1$ and $b_4$. Then the naïve approach would incorrectly assume that there may be records in the split that satisfy the predicate "value between $x_1$ and $x_2$" if $x_1 > b_1$ and $x_2 < a_2$. In some embodiments, range statistics are computed for a subset of fields having a given type. For example, range statistics may be computed for only numerical and date field, or alternatively may be computed for numerical, date, and string fields. In other embodiments, range statistics are computed for all fields, or for a predetermined subset of fields.

Embodiments of the present disclosure therefore uses a fast one-dimensional domain segmentation technique that generates multiple ranges for each field in each split. Given a bound k on the number of ranges for each field, and a set of values $\{v_1, \ldots, v_n\}$, the technique computes at most k segments of the min-max interval, i.e., at most k ranges, such that each $v_i$ is contained in some range and the ranges are configured "as tightly as possible." Exemplary resulting clusters 102, 103, 104, 105 are depicted in FIG. 1.

The algorithm works as follows for a given split: the distinct values among $v_1, \ldots, v_n$ are determined and sorted. If the number of distinct values is at most k, a separate range $[v_i, v_i]$ is created for each distinct value. Otherwise, there are l>k distinct values, denoted in ascending order as $v_{min} = a_1 < a_2 < \ldots < a_l = v_{max}$. The l-1 consecutive gaps $g_i = a_{i+1} - a_i$ are computed and sorted in descending order. Let $i(1), i(2), \ldots, i(k-1)$ denote the indices of the k-1 largest gaps. For each gap $g_{i(j)}$, the interval $(a_{i(j)}, a_{i(j)+1})$ is removed from $[v_{min}, v_{max}]$. What remains is a collection of k ranges—i.e., subintervals of $[v_{min}, v_{max}]$—of the form $[c_1, d_1], [c_2, d_2], \ldots, [c_k, d_k]$, where each $c_k$ and each $d_k$ is equal to one of the $v_i$'s. These are the ranges returned by the algorithm. If a predicate does not hit any of the ranges, the split can be eliminated.

For integer-valued and date-valued fields, $a_{i+1}-a_i-1$ is used rather than $a_{i+1}-a_i$ to define the size of the gap $g_i$. The former expression reflects the number of possible predicate values inside the gap that can affect the expressions $P_{eq}$ and $P_{range}$. In particular, gaps between two consecutive integers are never selected, because there is no benefit in doing so. If it is found that fewer than k−1 gaps have size $g_i=a_{i+1}-a_i-1>0$, the algorithm halts and forms exactly those ranges determined by the positive gaps.

Under a query workload having uniformly distributed equality and range predicates that hit the interval $[v_{min}, v_{max}]$, the foregoing scheme produces ranges that maximize the probability that a predicate will eliminate the split. To see this, assume without loss of generality that $v_{max}-v_{min}=1$. First consider a random equality predicate $q_e(attr, w)$ that searches for records with attribute attr equal to w. The probability that the split is eliminated equals the probability $P_{eq}$ that w lies in one of the k−1 selected gaps, where $P_{eq}=\Sigma_{j=1}^{k-1} g_{i(j)}$. Similarly, for a predicate $q_r(attr, w_1, w_2)$ that searches for all records having a value of attr between $w_1$ and $w_2$, the split is eliminated if both $w_1$ and $w_2$ lie in the same gap, which happens with probability $P_{range}=\Sigma_{j=1}^{k-1} g_{i(j)}^2$. Because $g_{i(1)}, \ldots, g_{i(k-1)}$ are selected to be the k−1 largest gaps, it follows that under the condition that there are at most k ranges, the choice of ranges simultaneously maximizes $P_{eq}$ and $P_{range}$.

If there happens to be workload information available, it may be exploited by redefining each $g_i$ as the fraction of historical predicate values that have fallen in the interval $(a_i, a_{i+1})$; thus $g_i$ estimates the probability that a future value will fall in this interval. Both the segmentation algorithm and optimality argument remain essentially unchanged.

Figure 2A:
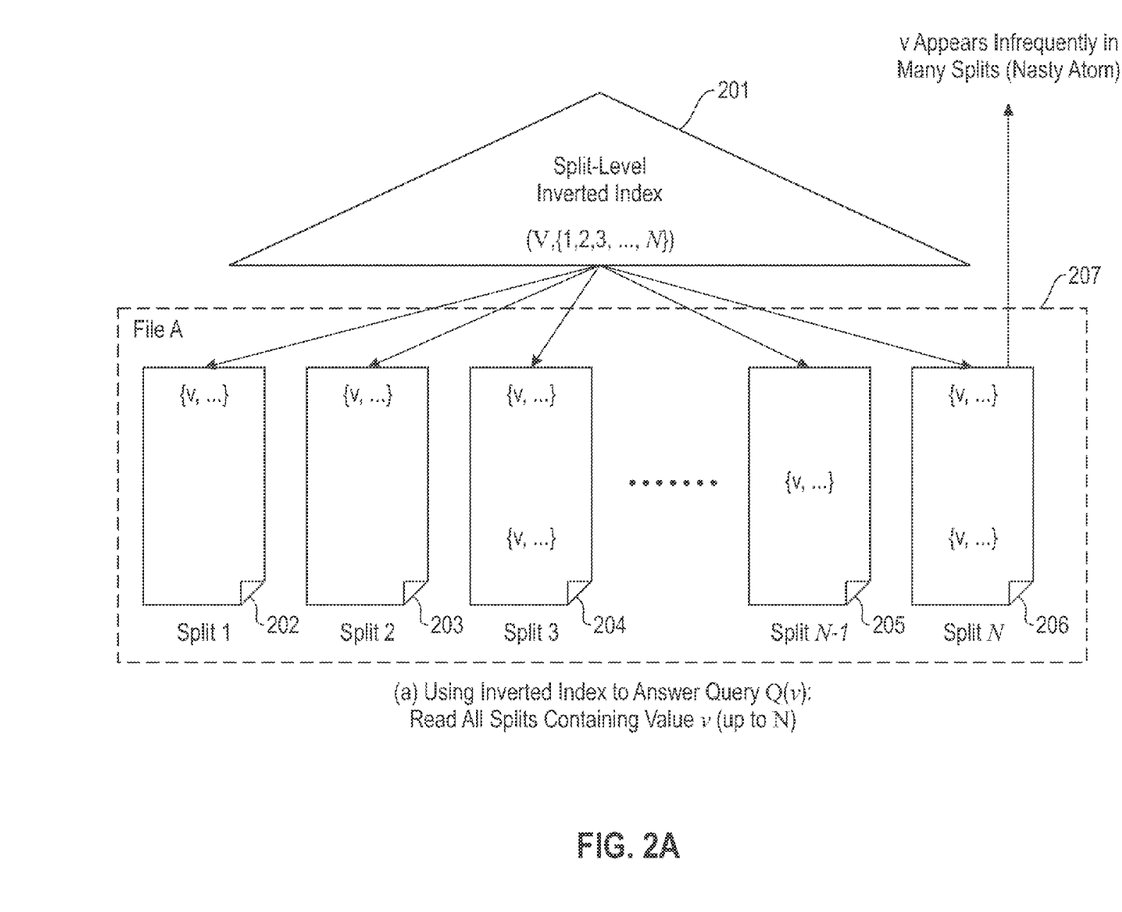
FIG. 2a depicts an inverted index according to an embodiment of the present invention.

Referring to FIG. 2a, an inverted index is depicted. Split-Level inverted index 201 refers to splits 202, 203, 204, 205, 206 of file 207.

Embodiments of the present disclosure build an inverted index 201 over each string field in the data file 207 and uses the index when evaluating equality predicates. The index 201 is implemented using fixed-length bitmaps, where the number of bits in each bitmap equals the number of splits in the dataset. The bitmap for a given atom v has its ith bit set to 1 if and only if the ith data split contains v. To compactly represent the index, each bitmap is compressed using Run-Length Encoding (RLE). RLE compression may reduce the index size by up to 85%.

Embodiments of the present disclosure construct the inverted index 201 by performing a single MapReduce job over the data. The map phase reports each atom v and the split ID in which v appears. The reduce phase then groups these output records according to v and merges the split IDs to form the bitmap array, which is then compressed using RLE.

Figure 2B:
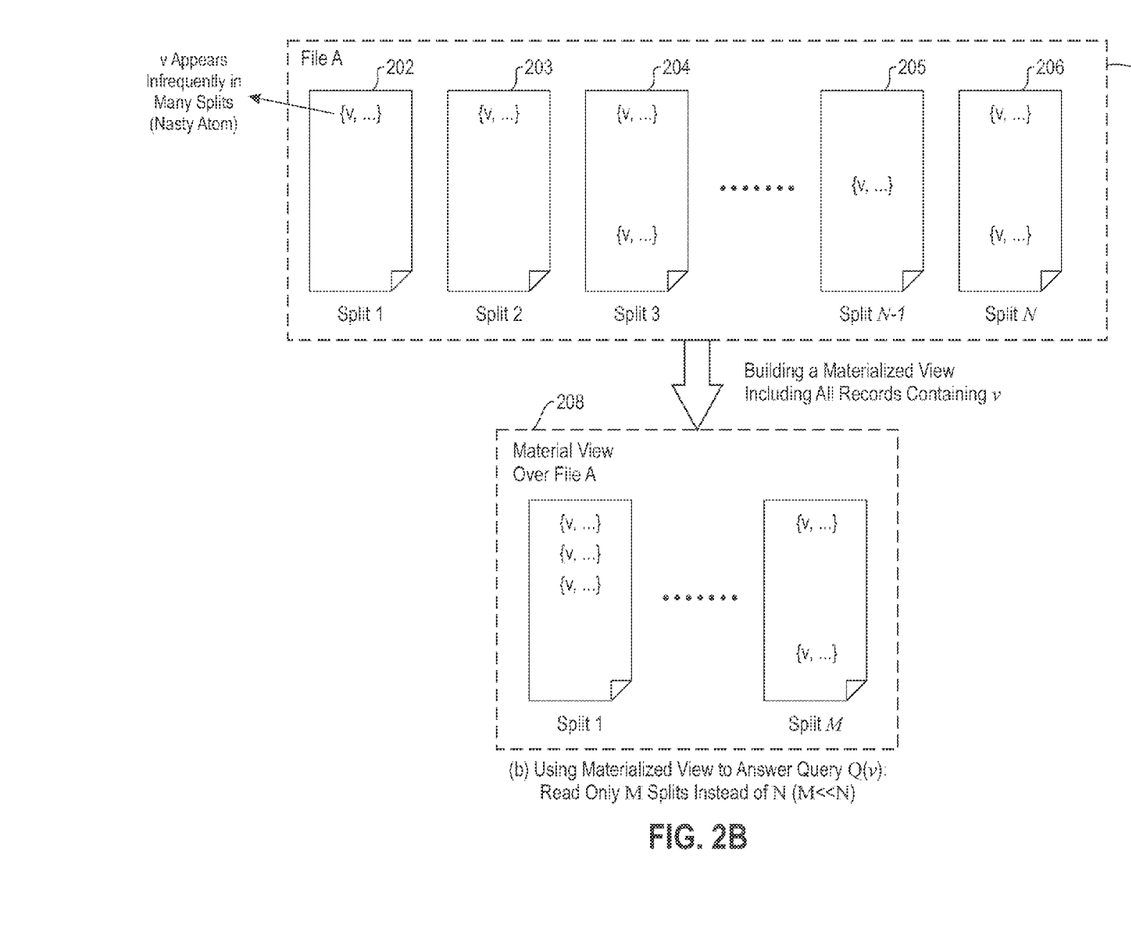
FIG. 2b depicts a materialized view according to an embodiment of the present invention.

Referring to FIG. 2b, a materialized view is depicted. Materialized view 208 is constructed from splits 202, 203, 204, 205, 206 of file 207.

FIGS. 2a and 2b give an example of a nasty atom v that appears once or twice in each of the N splits (202, 203, 204, 205, 206) of "File A" 207. If an inverted index is used as in FIG. 2a, all of these splits will be accessed whenever an equality predicate involving v is evaluated. However, by building a materialized view 208 on File A 207 that stores all records containing v, queries involving v can be answered by processing the M splits of the materialized view instead of the N splits of the original data, where M<<N.

The number of nasty atoms in a dataset may be very large and the allotted space for the materialized view may be very small, e.g., 1% or 2% of the data size. Thus it is necessary to choose the "best" subset of nasty atoms to store in the materialized view. This optimization problem is formulated as a submodular knapsack problem and embodiments of the present disclosure provide a practical approximate solution.

Denote by M and R the maximum number of splits and records that can fit in the materialized view. Also let splits(v) and records(v) be the set of splits and set of records containing a given atom v. Denote by |splits(v)| and |records(v)| the cardinalities of these sets. Each atom v that is considered for the materialized view has a profit defined as profit(v)=|splits(v)|−M and representing the number of splits saved due to reading splits in the materialized view instead of the original data splits containing v. For a set V of atoms considered jointly for inclusion in the materialized view, the overall profit is defined as profit(V)=$\Sigma_{v \in V}$ p(v)·profit(v), where p(v) is the probability that a query will contain an equality predicate that references atom v. The probability distribution p may be estimated from workload data if it is available, thus giving higher weight to frequently referenced atoms. If the query workload is unknown, then a uniform query distribution over all atoms in the dataset is assumed; in this case p(v) can be treated as a constant and effectively ignored in the analysis. In a similar manner, cost(v) is defined as the number of records that will be copied to the materialized view and thus use up part of its allotted space. The number of records may be used as a proxy for space consumed because it is extremely expensive to track the actual space consumption associated with each record. Noting that the sets records(u) and records(v) can overlap for distinct u and v, the cost of storing a subset V of atoms in the materialized view is defined as cost(V)=|$\cup_{v \in V}$ records(v)|.

The optimization problem is therefore to choose a subset of atoms V to maximize profit(V) subject to the constraint that cost(V)≤R. The function cost(V) is submodular and hence the optimization problem is a special case of the submodular knapsack problem. Unfortunately, this problem is very hard even to approximate: it is known that there is no approximation better than a multiplicative $\sqrt{n/\log n}$ factor. Furthermore, the problem contains as a special case the densest k-subgraph problem, for which no practical approximation algorithms are known. To develop a practical solution for constructing the materialized view, the overlap among record sets is ignored, and the cost is approximated (actually, overestimated) as cost(V)≈$\Sigma_{v \in V}$ cost(v)=$\Sigma_{v \in V}$ |records(v)|. In this case, the submodular knapsack problem reduces to a classical 0−1 knapsack problem. This approach yields good results in practice, especially since the space constraints in the problem are not hard constraints—i.e., using slightly more than (or fewer than) M splits is acceptable.

Even the simplified 0−1 knapsack problem is NP-complete, but efficient approximation algorithms exist. It is known that a (1−$\epsilon$)-approximation may be found in time polynomial in 1/$\epsilon$ and the number of elements (a fully polynomial-time approximation scheme (FPTAS)). Embodiments of the present disclosure, because they are dealing with massive datasets, use a simple greedy algorithm that provides a 0.5-approximation in the worst case. Where the costs are very small compared to the capacity of the knapsack, the greedy algorithm performs much better. Modifications to this algorithm are presented below to efficiently construct a materialized view over a given dataset in a scalable manner. Pseudocode is provided at Inset 1.

---

Inset 1: Filtered-based greedy algorithm for selecting the materialized view atoms.

selectNastyAtoms(S, R, L, α)
Input:
- Sets of n values, S = {v1, ..., vn},  // S contains all values in the dataset
- Maximum number of records in the materialized view R
- Minimum number of splits a value may appear in L.
- Overlapping factor α ≥ 1.
Output:
- OutputList = { }    // Output list containing the selected nasty values
(1)  Compute U = R/L. // U is the upper bound for the number of needed values
(2)  Build TopU list ← Scan the values in S and keep only the top U values w.r.t. profit(v)/cost(v).
(3)  Build SortedU list ← Sort the values in TopU list descendingly w.r.t. profit(v)/cost(v).
(4)  Define totRecords = 0.
(5)  For (1 ≤ i ≤ U) Loop
(6)    - Let v = SortedU(i).
(7)    - Add v to OutputList.
(8)    - totRecords += |records(v)|.  //Add the number of records containing v to the counter
(9)    - If (totRecords ≥ R * α) Then // If the number of records exceeded the materialized
(10)      - Exit the loop. // view capacity, then exit the loop.
(11) Return OutputList

---

The naive greedy algorithm sorts all atoms in the dataset with respect to decreasing profit(v)/cost(v) ratio. Then it selects atoms from the top of the sorted list and adds their corresponding records to the materialized view until it is full. This naive algorithm needs to be modified because (1) sorting all atoms in the dataset is very expensive especially when performed over the large-scale data manipulated by Hadoop, and (2) building the materialized view incrementally, e.g., by adding the records corresponding to a selected atom in each step, is infeasible in the Hadoop system since HDFS does not support random I/O over the data. To avoid sorting all the atoms in the dataset, we compute an upper bound U on the number of atoms that can possibly fit in the materialized view (see below). This upper bound is typically multiple orders of magnitude smaller than the total number of atoms in the dataset. Given U, a scan is performed over the atoms and the top U atoms with respect to their profit (v)/cost(v) ratio are kept (Step 2 in Inset 1). This step may be performed using a min-heap structure without any sorting. Finally, U atoms are sorted according to decreasing profit(v)/cost(v) ratio (Step 3), and then atoms are selected from the top of the list until the materialized view is full (Steps 5-10). A sorting step is still needed because U is an overestimate, but its cost is significantly lower than that of sorting all the atoms.

The upper bound U is computed as follows. A lower bound L is first introduced that represents the minimum number of splits in which an atom v must appear to be considered as a candidate for the materialized view. That is, if v appears in less than L splits, then its corresponding records are not deemed worthy of being accepted into the materialized view. Typically, L is defined as a multiple of the materialized view size, e.g., the default value for L in some embodiments is 3M; where M is the materialized view size in splits. Because an accepted atom v will appear at least once in each of L splits, it follows that v will contribute at least L records to the materialized view. The materialized view can hold at most R records, and thus the upper bound on the number of atoms sufficient to fill up the materialized view is U=R/L (Step 1 in Inset 1).

Because the materialized view cannot be built incrementally, the modified greedy algorithm reports the list of chosen atoms that will contribute to the materialized view (Step 7 in Inset 1). As each atom v in the sorted list is added to the materialized view, a counter is incremented by |records(v)|; the counter represents the amount of allotted space used up so far. In Step 9, the algorithm multiplies the maximum capacity of the materialized view (R) by an overlapping factor α, where α≥1, to heuristically account for the possible overlapping among record sets. The overlapping among record sets does not significantly affect the space utilization of the materialized view; e.g., when α is set to 1 (thus ignoring overlaps), the materialized view space is still approximately 95% utilized.

To create the materialized view for a given dataset, a map-reduce job is executed followed by a map-only job. In the map-reduce job, the map phase reports each atom v along with the split ID in which v appears and the number of records containing v in that split. The reduce phase groups the output records according to v, computes the total number of splits and records in which v appears, i.e., |splits(v)| and |records(v)|, and then executes the greedy algorithm of Inset 1. The map-only job then scans the data and copies the records containing the chosen atoms to the materialized view.

Figure 3A:
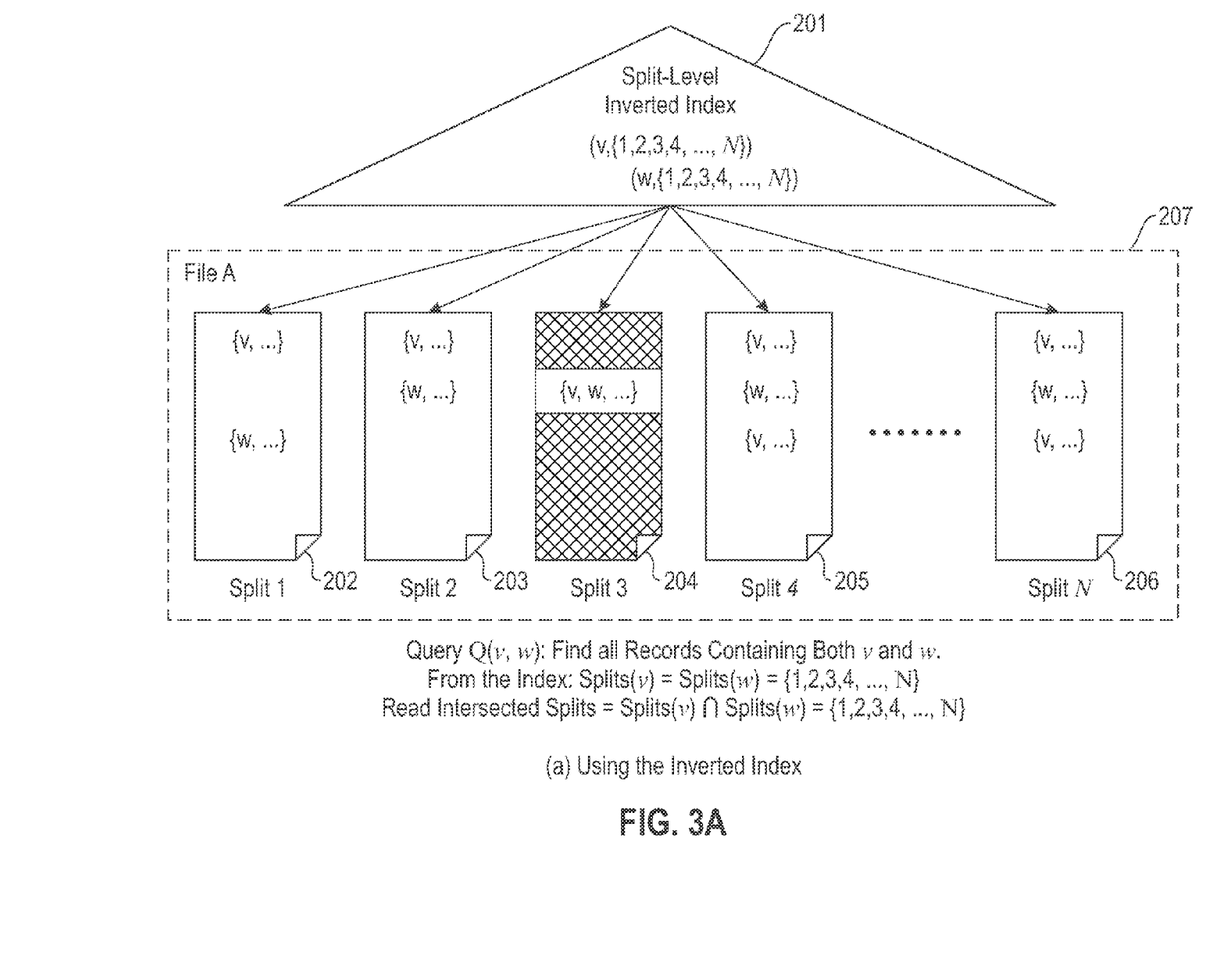
FIG. 3a depicts an inverted index according to an embodiment of the present invention.
Figure 3B:
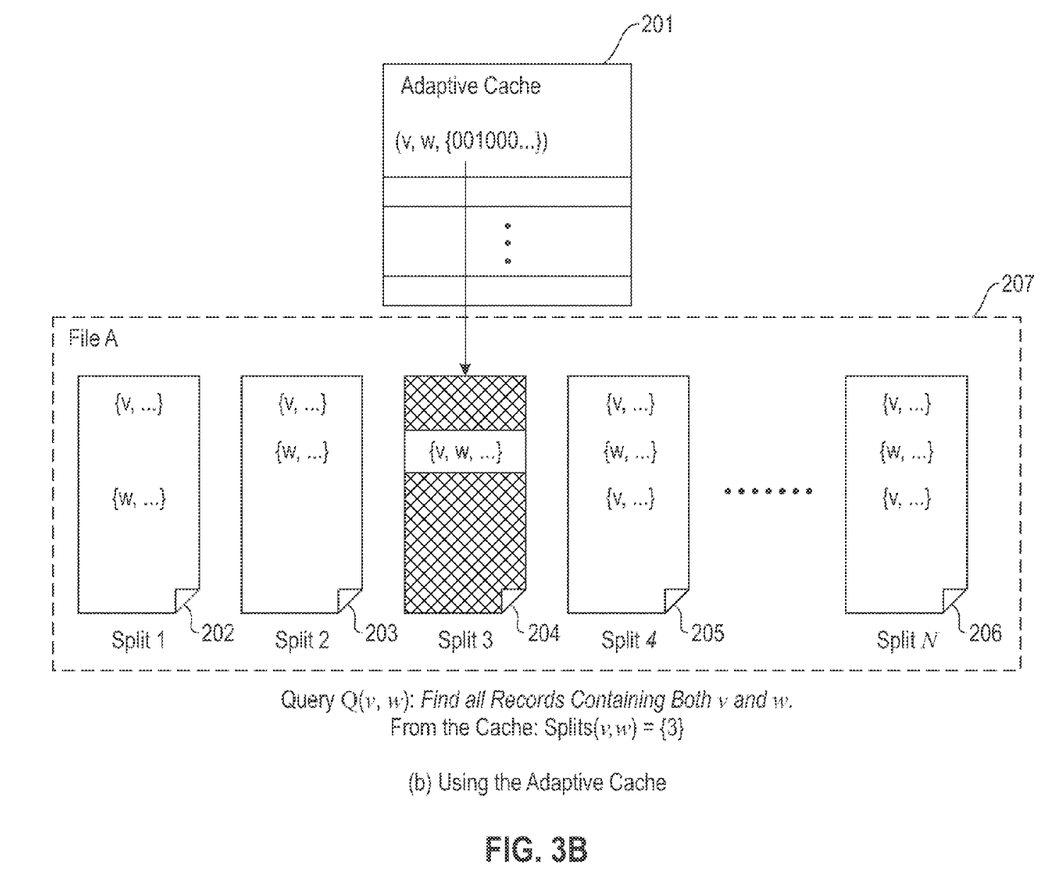
FIG. 3b depicts an adaptive cache according to an embodiment of the present invention.

FIGS. 3a and 3b illustrate adaptive caching according to embodiments of the present disclosure. Adaptive cache 301 contains data from splits 202, 203, 204, 205, 206 of file 207.

Embodiments of the present disclosure address the issue of nasty atom-pairs in which the individual atoms are frequent and appear in most (or all) of the splits, but the atom-pairs appear jointly in very few records, and hence in very few splits. This situation differs from the one handled by the materialized view described above, which helps only with atoms that appear in many splits but infrequently overall. In the case that discussed below, individual atoms might well appear frequently and hence not appear in the materialized view.

For example, FIGS. 3a and 3b show two atoms v and w such that each atom is frequent and appears in all splits, but the atom pair (v, w) appears in only one split (Split 3). Using the inverted index described above to find the splits containing (v, w) by computing splits(v) and splits(w) and then intersecting these two sets—which is the only strategy available in the absence of any other information—will result in most of the returned splits being false positives. According to embodiments of the present disclosure, techniques are provided for processing queries, denoted by Q(v, w), that return all records containing both u and w; this query will appear as a subquery of any Jaql query with a conjunctive selection predicate that references both v and w. Embodiments of the present disclosure process conjunctive queries involving more than two atoms by processing the atoms in a pairwise fashion and then intersecting the resulting sets of splits. An atom-pair (v, w) is defined to be a nasty atom-pair if $S_{(v, w)} > \theta$, where $S_{(v, w)} = |splits(v) \cap splits(w)| - |splits(v, w)|$. Here splits(v, w) denotes the set of those splits that contain the pair (v, w) in at least one record and θ is a (large) user-defined threshold. The quantity $S_{(v, w)}$ is precisely the number of false positives obtained when split lists for individual atoms v and w are intersected in an attempt to find those splits that contain the pair (v, w). Equivalently, $S_{(v, w)}$ is the potential savings in split accesses if the pair (v, w) is cached.

Building composite or multi-dimensional indexes, where the attribute combinations to be indexed are typically user-defined and are derived from workload and schema information are not feasible for a Hadoop scenario, because the query workload and (possibly loose) schema are typically unknown a priori—indeed, users may not even know the fields in the dataset beforehand. Moreover, algorithms for exploring the space of all possible atom-pairs to index are prohibitively expensive in large-scale data sets because they are inherently quadratic in time and space. Moreover, sampling and sketching techniques may be ineffective in finding nasty pairs because pairs are infrequent.

The present disclosure provides an adaptive main-memory caching technique in which the system monitors the query workload and the atom-pairs that are being queried, and then caches the pairs that are (1) recently queried, (2) frequently queried, and (3) nasty in that $S_{(v, w)} > 0$. As illustrated in FIG. 3b, the cache maintains atom pairs along with a bitmap specifying the splits containing this pair. As shown in the figure, the cache is significantly more efficient than the inverted index in answering query Q(v, w).

In order to monitor the query workload and to compute the actual splits containing a queried atom pair, i.e., to compute splits(v, w) for pair (v, w), Hadoop may be extended by enabling the map tasks to report back a new boolean flag—in addition to the existing system-maintained counters and time statistics—that indicates whether the map task produced any output tuples (True) or not (False). Given this extension, the system performs the steps in Inset 2 to execute a given conjunctive query Q(v, w) and to decide whether or not (v, w) is candidate for caching.

---

Inset 2: Executing a query Q(v; w).

(1) splits(v) ← Probe the inverted index by value v to get its set of split Ids
(2) splits(w) ← Probe the inverted index by value w to get its set of split Ids
(3) splitsToQuery(v,w) ← splits(v) ∩ splits(w) // The set of intersected splits
(4) Start the query (job) execution over the set of splits in splitsToQuery(v,w)
(5) splits(v,w) ← Identify the split Ids assigned to map tasks that produced output
(6) $S_{(v,w)}$ = |splitsToQuery(v,w)| − |splits(v,w)| // Number of false-positive splits
(7) If ($S_{(v,w)} > 0$) Then
(8)     - insertCache((v,w), splits(v,w), $S_{(v,w)}$ ) // Call the caching algorithm to insert (v,w)

---

By monitoring the map tasks that produce output, the systems determines the ID of every split that contains the (v, w) pair in at least one record (Step 5 in Inset 2). If the number of the false-positive splits $S_{(v, w)}$ is greater than the user-defined threshold, then (v, w) is considered for caching by calling the insertCache( ) algorithm presented below (Steps 6-8). Note that these steps are performed only if an initial probe of the cache does not return a split list for the pair (v, w), because the pair is not in the cache. The algorithm probeCache(v, w) used for this initial probe is described below.

As queries are issued over time, more and more candidate pairs are considered for caching. Because the cache size is limited, an efficient replacement policy is needed to keep the most promising pairs in the cache. Although an LRU replacement policy is easy to implement and maintain, LRU does not perform well for many query workloads. The main reason for this poor performance is that LRU takes into account only how recently an atom-pair has been queried, ignoring other important factors such as the potential savings in splits if the pair were to be cached. Therefore embodiments of the present disclosure adopt the SFR (Savings-Frequency-Recency) cache replacement policy, described below.

The SFR policy maintains in the cache the atom-pairs having the highest "weights," where the weight for a pair (v, w) depends on (1) the potential savings in splits due to caching the pair, i.e., $S_{(v, w)}$, (2) the historical frequency with which (v, w) has been queried, (3) how recently (v, w) has been queried. By taking the savings factor into account, SFR is able catch the "precious" atom pairs having high savings and cache them for a while even if they are not queried extremely frequently. Whenever these pairs are queried, the savings in splits is so significant that the overall efficiency of the cache will benefit by reserving some space for these precious pairs.

Figure 4:
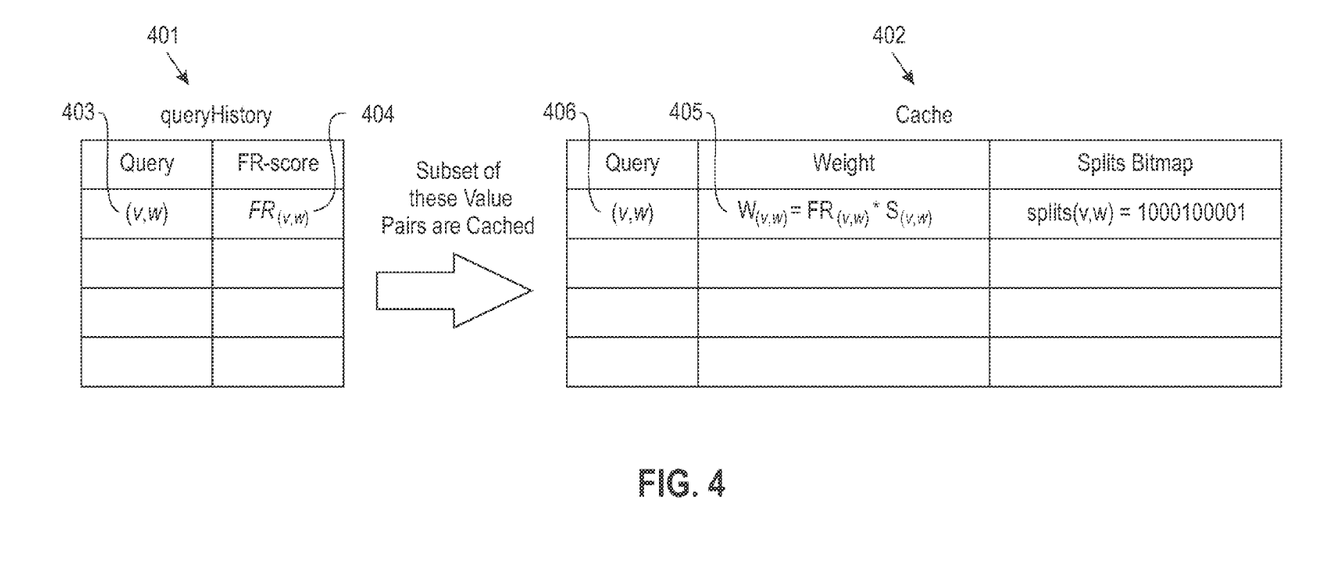
FIG. 4 depicts cache replacement data structures according to an embodiment of the present invention.

SFR maintains two data structures as shown in FIG. 4, queryHistory 401 and cache 402. The queryHistory structure 401 maintains a log of queried atom-pairs 403. Stored along with each pair is a partial weight 404, called the FR-score, that reflects both the frequency and recency of queries involving the pair. The FR-score does not take the potential savings into account. A small subset of these pairs is also stored in the cache structure; any pair stored in the cache structure also appears in queryHistory. Embodiments of the present disclosure do not allow the queryHistory table to grow indefinitely. The system allows entries with FR-scores below a user-defined threshold to be periodically pruned, and a timestamp can be used to eliminate entries that have not been updated for a long period of time.

The cache structure 402 maintains a list of nasty pairs. The final weight 405—which combines the FR-score and the potential savings in split accesses—is stored for each pair 406, along with a bitmap identifying the splits that contain the pair. The final weight for a pair (v, w) is obtained by multiplying the FR-score for (v, w) by the savings factor $S_{(v, w)}$.

Inset 3 displays pseudocode for the cache insertion algorithm, insertCache( ), for inserting a new (v, w) pair. Conceptually, with the arrival of each new pair, the FR-score of all items maintained in queryHistory decays in order to indicate that these items are getting older and to put more emphasis on the new pairs. Such decay could be implemented by multiplying the FR-score of every pair in queryHistory by a decay factor (having a value less than 1) every time a new atompair arrives. Because it is very expensive to perform this operation every time a pair arrives, we implement the same idea equivalently by applying a recency factor ρ to the new pair while keeping the other items in queryHistory unchanged. With every new pair, the recency factor gets amplified by a factor of λ>1 (Step 1). Then the algorithm updates the information in queryHistory by increasing the FR-score $FR_{(v, w)}$ by ρ if the pair already exists, or inserting a new record if the pair does not exist (Steps 2-5). The addition operation in Step 3 ultimately gives higher weights to frequently queried pairs. To insert (v, w) into the cache, the final weight $W_{(v, w)}$ is first computed (Step 6). Next, a new entry containing information for (v, w) is inserted into the cache if the cache has available space (Step 8); otherwise the algorithm finds the entry with the smallest weight, say $W_{(v', w')}$, and replaces this entry with the new one if $W_{(v, w)} > W_{(v', w')}$ (Steps 10-12). Because the recency factor ρ gets amplified with every new pair, it will eventually overflow. To avoid this problem, the system periodically—e.g., after every k new arrivals—normalizes all the scores while preserving their relative orders.

```
Inset 3: Inserting into the cache: insertCache( ) algorithm.

insertCache ((v,w), splits(v,w), S_(v,w))
Input:
        - (v,w): The value pair to cache
        - splits(v,w): Set of splits containing (v,w)
        - S_(v,w): The number of splits when caching (v,w)
Output: None
Global Parametrs:
        - Recency factor ρ = 1
        - Amplification factor λ = 1.001 (λ > 1 )
(1) Increase ρ = ρ x λ          // Amplify the recency factor
// Update the queryHistory information
(2) If (v,w) is in queryHistory Then
(3)     - FR_(v,w) += ρ          // The addition op. gives higher weight
                                    for frequent pairs
(4) Else
(5)     - Insert ((v,w), FR_(v,w) = ρ) into queryHistory
// Insert into the cache
(6) W_(v,w) = FR_(v,w) * S_(v,w)    //Compute the final weight of (v,w)
(7) If cache is not full Then
(8)     - Insert ((v,w), W_(v,w), splits(v,w))
(9) Else
(10)    - W_(v',w') ← Find the entry with the smallest weight, say for
          (v',w')
(11)    - If (W_(v',w') < W_(v,w)) Then
(12)    - Replace the entry of (v',w') with the entry of ((v,w), W_(v,w),
          splits(v,w))
```

Pseudocode for the probeCache( ) algorithm mentioned previously is given in Inset 4 and is a simplified version of the insertCache( ) algorithm. If the cache is probed with a given pair (v, w) and the pair is in the cache (a cache hit), then the algorithm updates the $FR_{(v, w)}$ and $W_{(v, w)}$ scores in queryHistory and cache, respectively, and returns a list of split IDs corresponding to that pair, i.e., splits(v, w) (Steps 2-5). Notice that if (v, w) is in the cache, then it is guaranteed to have a corresponding record in the queryHistory table. If the probe results in a cache miss, then the algorithm returns Null (Step 7).

```
Inset 4: Probing the cache: probeCache( ) algorithm.

probeCache ((v,w))
Input:
        - (v,w): The probing value pair
Output:
        - List of splits to query (if cache hit) or Null (if cache miss)
Global Parameters:
        - Recency factor ρ = 1
        - Amplification factor λ = 1.001 (λ > 1)
(1) If (v,w) is cache hit Then
(2)     - Increase ρ = ρ x λ       // Increase the recency factor
(3)     - FR_(v,w) += ρ            // Update FR-score in queryHistory
(4)     - W_(v,w) = FR_(v,w) * S_(v,w)  // Update the weight in the cache
(5)     - Return splits(v,w) from the cache
(6) Else
(7)     - Return Null
```

SFR is sensitive to the amplification factor λ. The higher the value of λ, the more emphasis is added to the recency factor against the frequency and savings factors (and vice versa). For example, as λ gets larger, the performance of SFR gets closer to that of LRU.

Figure 5:
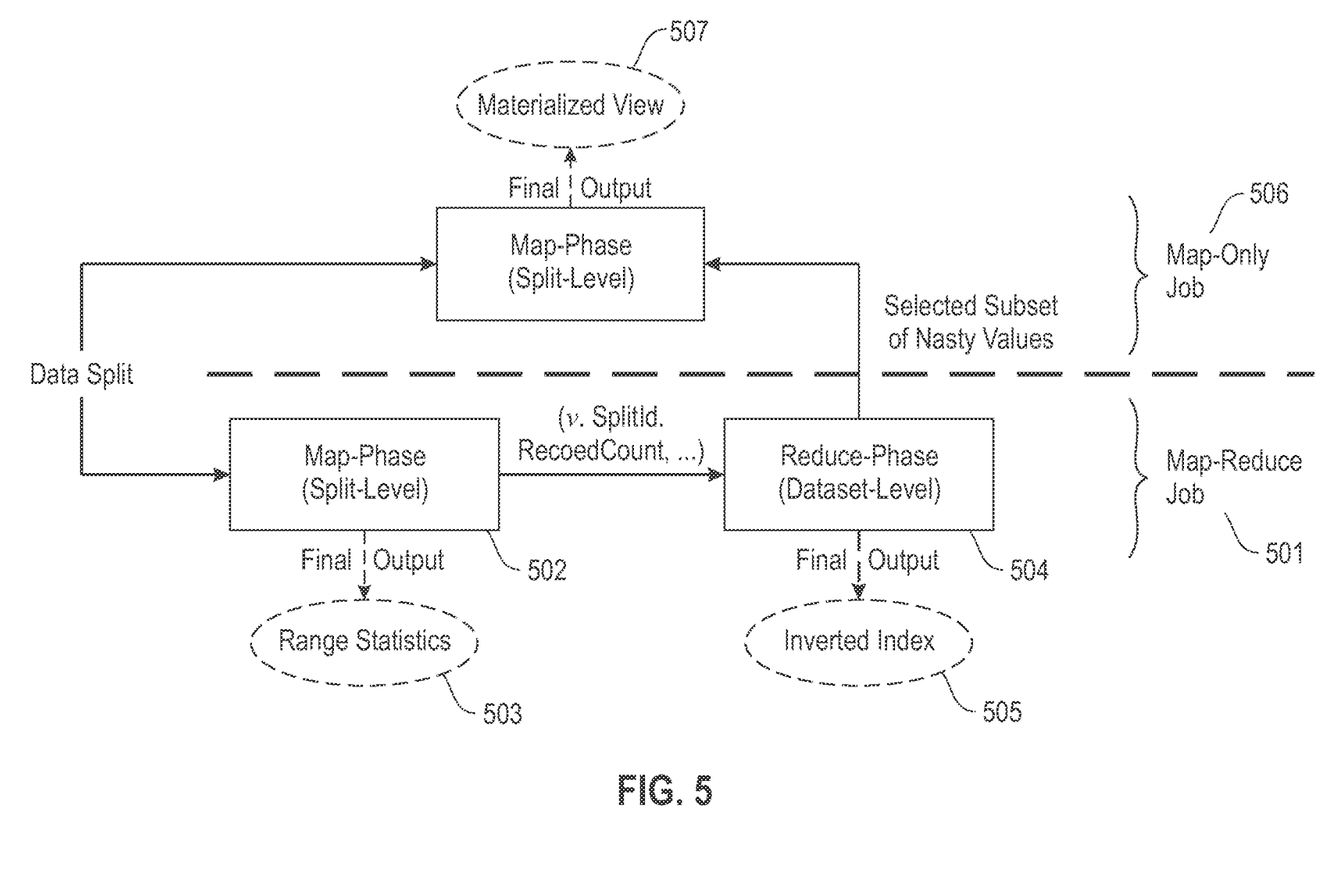
FIG. 5 depicts a computational flow according to an embodiment of the present invention.

FIG. 5 depicts a computational flow according to embodiments of the present disclosure. To efficiently build the ranges, indexes, and materialized view without unnecessary scans over the data, embodiments of the present disclosure share the map and reduce tasks whenever possible among the different computations. In FIG. 5, a flow diagram of computations according to embodiments of the present disclosure is provided. These computations require only two passes over the data. In the first pass (lower half of the diagram), a map-reduce job 501 is performed in which the map phase 502 computes the range statistics 503 and reports each atom v along with its split ID and the number of records in the split that contain v. The reduce phase 504 groups the records generated during the map phase according to v, builds the full inverted index 505, and applies the modified greedy algorithm in Inset 1 to identify the subset of nasty atoms to be included in the materialized view. In the second pass (upper half of the diagram), a map-only job 506 is executed that copies to the materialized view 507 every data record that contains one or more of the selected nasty atoms. Importantly, any of the indexing components can be turned on or off using boolean flags, depending on user requirements. For example, if the data will not be queried frequently enough, then users may not be interested in paying the cost of building the materialized view. In this case, the analysis tool automatically bypasses the execution of the modified greedy algorithm in the reduce phase and also skips the second map-only job.

Embodiments of the present disclosure apply several techniques for split elimination: range and inverted index, materialized view, and adaptive cache. As described below, these components are used to compute a minimal list of splits to be processed for a query with selection predicates.

The indexes and the statistical information computed for each split may be stored using several methods. They may be stored in a central repository or distributed and stored together with their corresponding splits. As discussed above, Hadoop has significant overheads for creating map tasks. To avoid such overheads, it is desirable to eliminate the splits before the map tasks are created. Therefore, in embodiments of the present disclosure, the range and inverted index are stored in a central repository that is queried once by the Hadoop InputFormat process before Hadoop's JobTracker creates the required mappers and assigns splits to each mapper. In embodiments of the present disclosure an RDBMS is used for this purpose. However, any, possibly lightweight, repository may be used that supports indexes. The materialized view contains copies of some selected records and is stored in HDFS in the same format as the original data file.

An algorithm is provided that takes as input a conjunctive predicate of the form $P = p_1 \wedge p_2 \wedge \ldots \wedge p_n$ and a file name, and returns a list containing the IDs of the splits in the file that must be processed in order to evaluate the predicate P. This algorithm is invoked from the InputFormat, and as a result can be used with any high-level query language on Hadoop, including Hive, and Pig, as well as incorporated into plain map reduce jobs. Both the materialized view and the list of splits in the materialized view are denoted MV. The algorithm first initializes List, the list of split IDs, to contain the IDs of every split in the file, thus representing the set of splits that must be processed in the absence of additional information. The algorithm uses the range and inverted indexes (inverted index for equality predicates and range index for inequality predicates), and the adaptive cache for equality predicates and uses the range statistics for non-equality predicates. (Here = and in are considered to be the equality predicates.) The final list of splits to process is computed as the intersection of the split lists for all of the $p_i$'s, since predicate P is a conjunction. Finally, if any one of the equality predicates in P can be applied using the materialized view MV, then the size of the final split list is compared with the number of splits in MV, and the option with the smaller number of splits is chosen.

In the general case where the query contains both conjunctions and disjunctions, the query predicate is converted into disjunctive normal form, the above algorithm is executed on each of the conjuncts, and finally the union of the resulting split lists is taken to compute the final list of split IDs to process. Some care must be taken, however, in the presence of the materialized view. Specifically, if the algorithm returns split IDs from MV for at least one conjunct D then it is possible to access a given record twice, once from MV when processing D and once from the original data file when processing another conjunct $D_j$ for which MV is not used. To avoid this problem, the previous algorithm is modified to return for each conjunct D the split list that is computed without MV usage, denoted by List($D_i$), and a boolean, denoted by useMV($D_i$), that indicates whether or not MV could possibly be used to process $D_i$. The final algorithm is provided in Inset 5. It returns the split IDs in MV if and only if MV can be used for all of the disjuncts (Steps 6-7); otherwise, the algorithm returns the union of the split lists for all disjuncts (Step 8).

---
Inset 5: Split list computation with disjunctions.
--- evaluatePredicate (file, P)
Input: P = a predicate with conjunctions and disjunctions
      file = the file to query
Output: List of split IDs to process
(1) If P contains at least one disjunction Then
(2)     convert P into disjunctive normal form: $D_1$ V $D_2$ V . . . V $D_n$
(3) Else $D_1$ = P
(4) For each $D_i$ Loop
(5)     {List($D_i$), useMV($D_i$)} = evaluateConjunct'(file, $D_i$)
(6) If useMV($D_i$) = true for all 1 ≤ i ≤ n Then
(7)     Return MV
(8) Else Return $\cup_{1 \leq i \leq n}$ List($D_i$)

---

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   receiving a query comprising at least one predicate, the query referring to data comprising a plurality of records, each record comprising a plurality of values in a plurality of attributes and each record being located in at least one of a plurality of blocks of a distributed file system, each block having a unique identifier;
   for each block of the distributed file system, determining for an attribute of the plurality of attributes at least one value cluster, each value cluster having a range; and
   comparing the predicate of the query with the at least one value cluster of each block, and executing the query against those blocks where the predicate is met by at least one value cluster;
   receiving a result of the execution of the query from a subset of the plurality of blocks;
   determining the number of blocks in the subset;
   determining the number of blocks against which the query was executed;
   storing in a cache the identifier of each block in the subset if the difference between the number of blocks on which the query was executed and the number of blocks in the subset exceeds a predetermined value, the cache having a size limit;
   storing a frequency of the query and a recency of the query;
   determining a weight of the query such that the weight increases with the frequency, with the recency, and with the difference between the number of blocks on which the query was executed and the number of blocks in the subset;
   removing items from the cache in order of increasing weight until the cache size is less than or equal to the cache size limit
   receiving an additional query;
   determining whether there is a cache hit for the additional query; and
   if there is a cache hit for the additional query, executing the additional query against only those blocks whose identifiers appear in the cache.

2. The method of claim 1, wherein block comprises a split and the distributed file system is a Hadoop Distributed File System.

3. The method of claim 1, wherein executing the query comprises executing a MapReduce job of a MapReduce system.

4. The method of claim 1, wherein determining at least one value cluster comprises sorting the values of the attribute and determining maximal contiguous ranges such that no values of the attribute fall within the ranges.

5. The method of claim 4, wherein the number of maximal contiguous ranges is predetermined.

6. The method of claim 1, further comprising:
   traversing each of the plurality of blocks to determine unique values located in each block;
   building an index mapping the unique values to the block identifiers of the blocks in which the unique values appear;
   comparing the predicate of the query with the index, and executing the query against only those blocks where there exists a mapping in the index from a predicate value to the identifiers of those blocks.

7. The method of claim 6, wherein the unique values each have a data type, the data type selected from the group consisting of: numeric; textual; and date.

8. The method of claim 1, wherein the result comprises a plurality of resulting values.

9. A method comprising:
   receiving a query comprising a plurality of predicates, the query referring to data comprising a plurality of records, each record comprising a plurality of values in a plurality of attributes and each record being located in at least one of a plurality of blocks of a distributed file system, each block having a unique identifier;
   for each block of the distributed file system, determining for an attribute of the plurality of attributes at least one value cluster, each cluster having a range;
   traversing each of the plurality of blocks to determine unique values located in each block and building an index mapping the unique values to the block identifiers of the blocks in which the unique values appear;
   maintaining a cache containing the identifiers of blocks from which results were received as a result of execution of prior queries;
   for each predicate of the plurality of predicates, determining a list of blocks by either:
      comparing the predicate with the at least one value cluster of each block to determine those blocks where the predicate is met by at least one value cluster;
      comparing the predicate with the index to determine those blocks where there exists a mapping in the index from a predicate value to the identifiers of those blocks; or
      determining whether there is a cache hit for the predicate and if there is a cache hit, determining those blocks whose identifiers appear in the cache;
   converting the query into a disjunctive normal form, the disjunctive normal form comprising at least one conjunctive clause, and each of the predicates of the plurality of predicates being within one of the at least one conjunctive clauses;

determining an execution list of blocks based on the list of blocks for each predicate, wherein determining the execution list of blocks comprises taking the intersection of the lists of blocks for the predicates within each conjunctive clause to form a clause list for each conjunctive clause and taking the union of the clause lists; and executing the query against those blocks appearing in the execution list of blocks.

10. The method of claim 9, further comprising:

determining whether a conjunctive clause is applicable to a materialized view having a number of blocks; and executing the conjunctive clause against the materialized view if the conjunctive clause is applicable to the materialized view and if the number of blocks of the materialized view is less than a size of the clause list for the conjunctive clause.

* * * * *